United States Patent
Nagai et al.

(10) Patent No.: US 6,405,099 B1
(45) Date of Patent: Jun. 11, 2002

(54) AUTOMATIC CONTROL SYSTEM (75) Inventors: Shigekazu Nagai, Tokyo; Hiroyuki Shiomi, Ibaraki-ken, both of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/331,187

(22) PCT Filed: Dec. 24, 1997

(86) PCT No.: PCT/JP97/04794

§ 371 (c)(1), (2), (4) Date: Jun. 24, 1999

(87) PCT Pub. No.: WO98/29804

PCT Pub. Date: Jul. 9, 1998

(30) Foreign Application Priority Data

Dec. 25, 1996 (JP) .............................. 8-346204

(51) Int. Cl.$^7$ ........................... G06F 19/00; G05B 19/18
(52) U.S. Cl. ............................... 700/159; 700/2; 700/4; 700/20; 709/203
(58) Field of Search .................... 700/2, 4, 11, 20, 700/159, 160, 180; 707/501; 709/201, 203, 302

(56) References Cited

U.S. PATENT DOCUMENTS

| 5,805,442 A | * | 9/1998 | Crater et al. ................. 364/138 |
| 5,847,957 A | * | 12/1998 | Cohen et al. ........... 364/468.15 |
| 5,870,719 A | * | 2/1999 | Maritzen et al. ............... 705/26 |
| 5,950,201 A | * | 9/1999 | Van Huben et al. .......... 707/10 |
| 5,956,487 A | * | 9/1999 | Venkatraman et al. . 395/200.48 |
| 6,061,603 A | * | 5/2000 | Papadopoulos et al. ....... 700/83 |
| 6,139,177 A | * | 10/2000 | Venkatraman et al. ...... 364/188 |

FOREIGN PATENT DOCUMENTS

| JP | 4-133105 | 5/1992 |
| JP | 7-230335 | 8/1995 |
| JP | 8-263447 | 10/1996 |

OTHER PUBLICATIONS

Nikkei Baito, No. 159, Nov. 22, 1996 (Tokyo) Shinichi Jinbo, Yoshihisa Miwa, "Feature Article Conditions of Internet Computers (in Japanese)" pp. 202 to 231, particularly refer to p. 221; FIG. 3.

Nikkei Computer, No. 388, Apr. 1, 1996 (Tokyo) Keisuke Kitano, "New Language Java in Internet Age. It can be Performed Independently of Machine and OS (in Japanese)" p. 101 to 107.

Robotics Society of Japan "Preprint 14$^{th}$ Scientific Lectures of Robotics Society of Japan" Nov. 1, 1996 p. 817–818.

Tool Engineer, vol. 40, No. 12, Dec. 1, 1996 (Tokyo), Ryuji Wada, Aim and Feature of OSEC (in Japanese) especially see "Future OSEC", on p. 33.

Electronics Magazine vol. 41, No. 11, Nov. 1, 1996, (Tokyo), Shinsuke Takemura, "Application of TCP/IP to FA Information Network (in Japanese)" pp. 30 to 33, especially see "5. Future Possibility", on p. 33.

\* cited by examiner

*Primary Examiner*—Paul P. Gordon
(74) *Attorney, Agent, or Firm*—Oblon, Spivak, McClelland, Maier & Neustadt, P.C.

(57) ABSTRACT

An automatic control system comprising a server offered by a service provider that stores control applets to control a particular control object device, a control device including a control object device and a computer device to control the control object device, and a network to connect the server with the control device; the computer device includes a browser function, and an interpreter to execute the control applets, and the computer device accessing the server through the network to download and execute a desired control applet, whereby making control of the control object device.

6 Claims, 6 Drawing Sheets

AUTOMATIC CONTROL SYSTEM

FIELD OF INVENTION

The present invention relates to an automatic control system, such as an FA system. Specifically, it relates to an automatic control system which is configured so that a control program (control applet) to control the control object device is downloaded to the control device (computer device) having a browser function and an interpreter environment through the network and executed. This allows a control program to be utilized independently of the difference in processor, OS, bus configuration, network (communication) protocol, etc.

BACKGROUND OF THE INVENTION

Up to now, for the purposes of achieving labor saving and higher reliability, automatic control systems using a computer to automatically control a variety of control objects and control object devices have been used in a number of fields. Examples include actuator controllers for a variety of machine tools used in the production lines at a variety of manufacturing plants, controllers for assembling machines, and production management systems to make integrated control of these controllers, plant management systems, and other FA systems, medical systems to control such devices as ultrasonic diagnostic devices, and CT scanning devices, DNA experimental analyzing systems.

These conventional automatic control systems essentially comprise a control device (computer device) providing the heart of the control system, and a variety of devices, such as machine tools, which are objects of control, and are configured so that the computer reads the control program stored in the storage, such as the hard disk device provided for the computer device, and executes it, whereby automatically controlling the object, such as a machine tool, to the desired state.

With the technical advance of the microprocessor and magnetic disk device in recent years, microprocessors having high performance and hard disk devices with large capacities have become available at low cost and in quantity, thus the configuration of the automatic control system has been diversified in such a way that the computer device providing the heart of a control system is configured so that it hierarchically connects devices different in performance, such as operation speed, and storage capacity to each other with a network, and the control object device itself incorporates a microprocessor having a basic control function.

Therefore, in the present situation, control programs are prepared separately by using languages, instruction formats, and data formats which can vary depending upon the system supplier, the manufacturer supplying a control object device, such as a machine tool, and the user who employs such system and device, and upon the OS (operating system) for the computer device with which the control program itself is executed, the bus configuration between computer devices, or between a computer device and the object device controlled by the computer device, the network (communication) protocol, etc.

However, the conventional automatic control systems as mentioned above have presented problems of that there is the need for separately preparing a control program every time a computer device with a different OS is used, or every time the bus configuration between computer devices, or between a computer device and the object device controlled thereby, the network (communication) protocol, or other is different, thus, the man-hours and cost for control program development are increased, and the man-hours for control program management is also increased.

Also, using a personal computer, the standardization of which has progressed in recent years, as an automatic control system presents various problems of that there is the need for providing an OS, hard disk device, memory, etc. dedicated for the personal computer, and especially with a manufacturing plant, measures against vibrations and heat must be taken.

The present invention has been provided to solve the problems as stated above, being intended to offer an automatic control system allowing a control program to be utilized independently of the difference in computer device constituting an automatic control system, OS for computer device, or bus configuration between computer devices, or between a computer device and the object device controlled thereby, network (communication) protocol, etc.

SUMMARY OF THE INVENTION

To achieve the above purposes, the present invention offers an automatic control system comprising a server (160) offered by a service provider that stores control applets to control a particular control object device, a control device (120) comprising a control object device (140) and a computer device (130) to control the control object device, and a network (150) to connect the server with the control device; the computer device comprising a browser function (132), and an interpreter (134) to execute the control applet, and the computer device being configured for accessing the server through the network to download and execute a desired control applet, whereby making control the control object device.

DESCRIPTION OF THE PREFERRED EMBODIMENTS

For the automatic control system according to the present invention, preferred embodiments thereof will be explained in detail with reference to the accompanying drawings.

Figure 1:
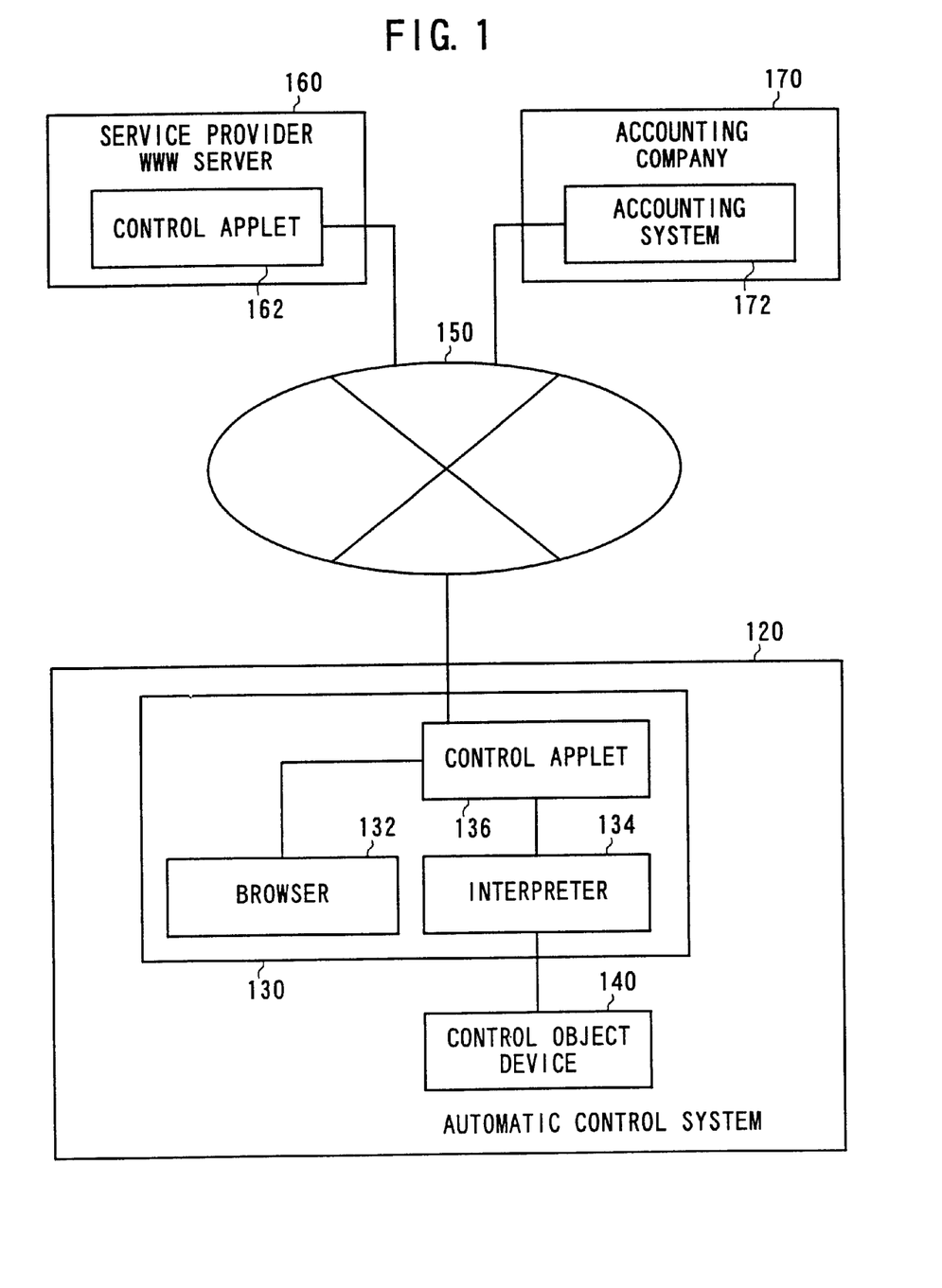
FIG. 1 shows a system configuration diagram illustrating a configuration of the automatic control system according to an embodiment of the present invention.

FIG. 1 shows a system configuration diagram illustrating a configuration of the automatic control system according to the embodiment.

The reference numeral 160 denotes a server offered by a service provider, for example, the WWW -(World Wide Web) server which is connected to the world scale network known as Internet, and an intra-business network called Intranet.

The server 160 stores control programs, such as a driver to control the actuator for a variety of control object devices 140, for example, a machine tool. With the present invention, a control program is referred to as a control applet 162.

Herein, the applet is a term referring to software operating on other software, being generally equivalent to the application program, and in recent years, the programming technology using an object oriented intermediate language, as typified by JAVA (the registered trademark of Sun Microsystems, Inc.), is being spotlighted, and programs prepared in the JAVA language are called JAVA applets.

The JAVA applet can be downloaded from the WWW server, for example, through a network, such as Internet and Intranet, to a personal computer having a browser function that is connected to the network, i.e., a personal computer provided with an environment allowing Internet or Intranet to be used, and can be executed under the JAVA interpreter environment for the personal computer.

The control applet 162 in the present invention is a JAVA applet, for example, as described above, being stored in the server 160 as a control applet for a variety of control object devices, and is configured to be supplied, through network 150, such as Internet and Intranet, to a computer device connected to the network.

On the other hand, the control device 120 comprises a control object device 140 and a controller 130 which supplies the control applet 136, the desired software, to the control object device 140. The controller 130 has a browser function 132 which can be connected to the server 160 offered by the service provider through the network 150, such as Internet and Intranet.

The controller 130 is further provided with an interpreter 134 which can convert the control applet 136 downloaded from the server 160 through the network 150 into the format which can be executed by the control object device 140.

An accounting company 170 is not an element which is essential for the automatic control system of the present invention, however, it achieves a function to use an accounting system 172 for accounting at the time when the control device 120 for a particular user that is connected through the network 150 downloads a variety of control applets 162 supplied by the server 160, and distribute the service charges among the service providers. Such an accounting system provides a capability which has been advocated as an electronic commerce system in recent years.

The automatic control system according to the present invention is basically configured as above, and the operation and effects will be described hereinafter.

The user having a control device 120 comprising a control object device 140 and a controller 130 to control the control object device 140 accesses the server 160 of the service provider supplying control applets 162 through the network 150, and requests the control applet 162 to control the control object device 140.

The server 160 transmits the requested control applet 162 to the controller 130 in the control device 120 for the user through the network 150.

The controller 130 for the user downloads the control applet 162 transmitted through the network 150 as a control applet 136, and executes the control applet 136 by means of the interpreter 134 to control the control object device 140.

Figure 2:
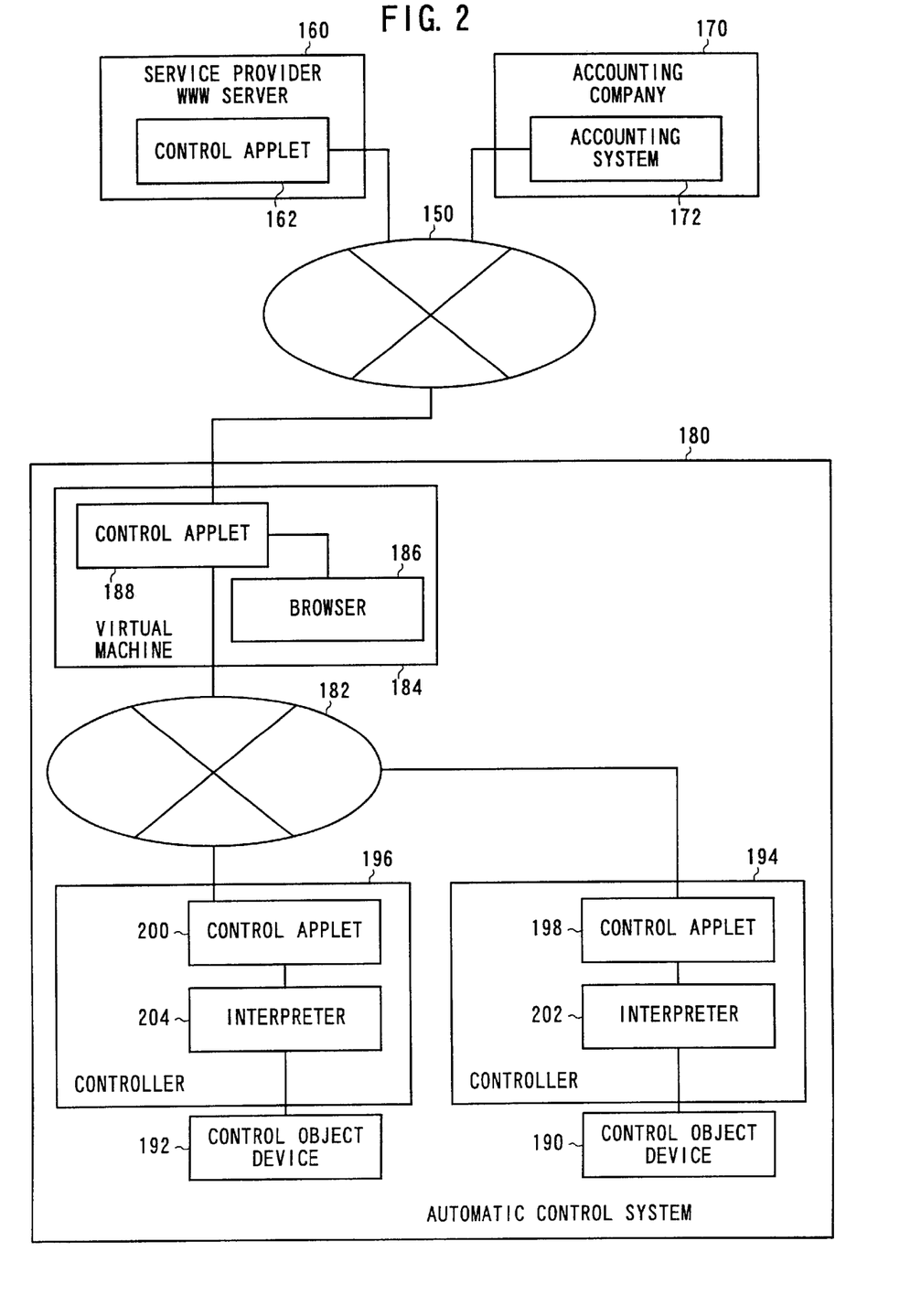
FIG. 2 shows a system configuration diagram illustrating another configuration of the automatic control system according to the embodiment.

The above mentioned control device 120 can be configured as shown in FIG. 2. For example, the control device 180 connected to the network 150 is equipped with a lower level FA network 182, the network 150 being connected with the FA network 182 by means of a virtual machine 184. The virtual machine 184 downloads the desired control applet 188 from the server 160 through the network 150 by means of the browser 186, and transmits it to the respective controllers 194 and 196 for the control object devices 190 and 192 through the FA network 182. In this case, the controllers 194 and 196 select the desired control applet 198 and 200, and by means of the interpreter 202 and 204, control the control object device 190 and 192, respectively.

Thus, by furnishing a driver or other control program to control the control object device 140, or 190 and 192, to the automatic control system as a control applet 136, or 198 and 200, such as a JAVA one, the need for a storage medium, such as a hard disk, is eliminated, which allows the system to be run with no obstacles in an environment susceptible to vibrations, dirt and dust, or other as inside the plant.

Figure 3:
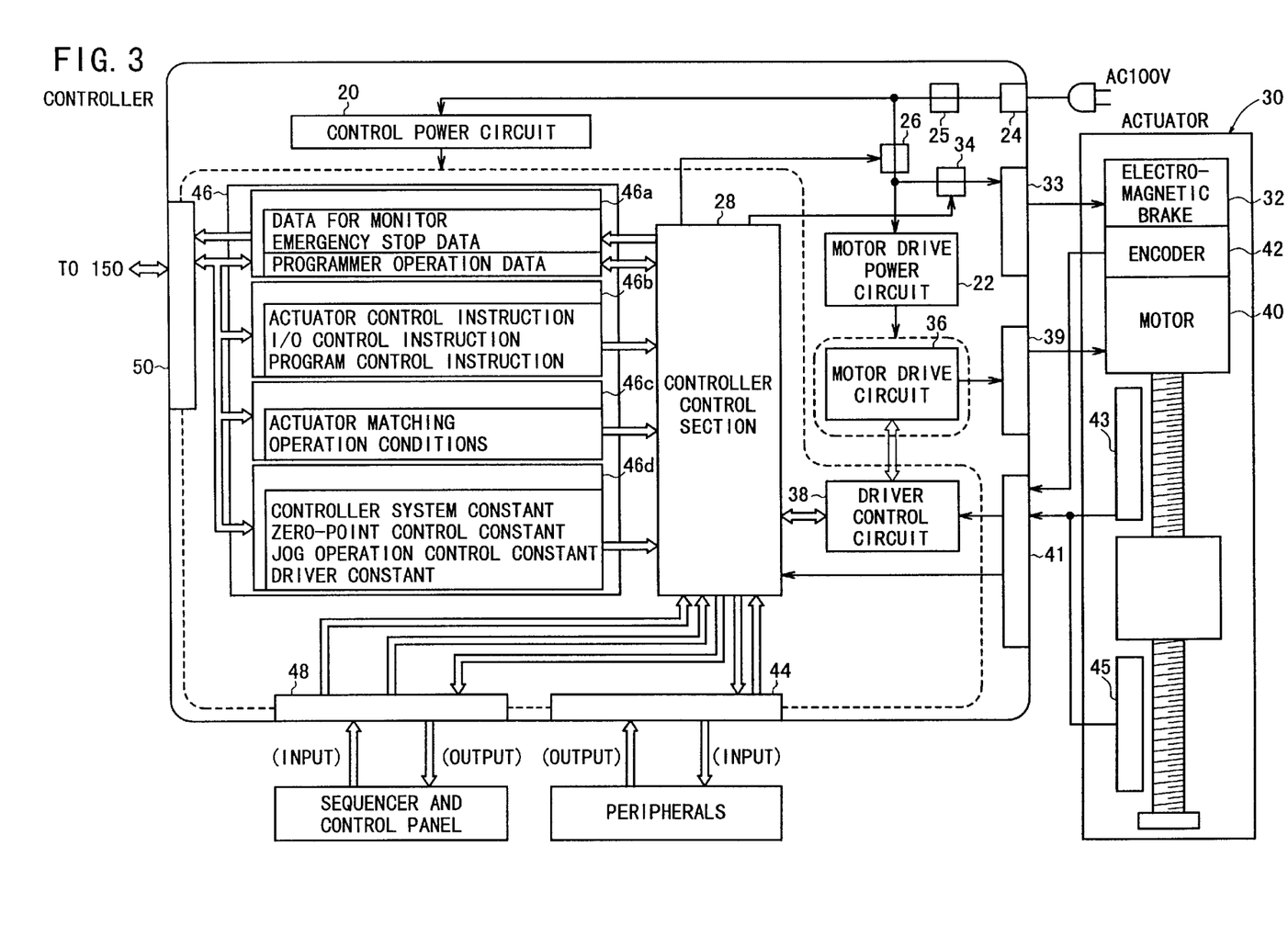
FIG. 3 shows a configuration block diagram of the actuator controller.

Next, the automatic control system that is related to the present invention will be described by taking, as an example, the aspect of embodiment wherein it is applied to a FA system having a single-axis motor-operated actuator controller as shown in FIG. 3.

The controller is composed of an AC power supply module, an AC servomotor driver module, a single-axis control module, a communication port (a communication module) to communicate with the server offered by a service provider through the LAN network, such as Internet and Intranet, and a general-purpose input/output module, being equipped with a controller control section 28 having a browser function, and an interpreter environment to execute the control applet.

The AC power supply module comprises two power circuits, one of which is the control power circuit 20 which supplies weak DC power to the control circuits, etc. for the control module, the interface module, the general-purpose input/output module, and the AC servomotor module, and the other of which is the motor drive power circuit 22 which supplies high-voltage high-current to drive the motor. To both is power collectively supplied from the supply power terminals 24 (AC 100 V in FIG. 3) provided for the power supply module. Between the motor drive power circuit 22 and the supply power terminals 24, the drive power shut-off relay 26 is provided, being connected through the power switch 25, and the controller control section 28 (single-axis control module) later described controls the power ON/OFF. This is done for:

1) Assuring a high degree of safety by shutting off the motor drive power as the final measure in failure.
2) Eliminating the need for a special external device for use as the above measure by incorporating a shut-off relay 6 and a shut-off routine, which is effective especially in the standalone or other type of single operation.
3) Allowing the shut-off routine to be synchronized with the other control routines in failure, which permits the power to be shut off with a timing that would not be realized with a shut-off measure using an external device. For example, an instantaneous maximum torque causes the motor to be stopped with an implementation of drive power shutoff.

Further, the power supply module supplies the disengaging power for the electromagnetic brake 32 provided for the motor-operated actuator 30 through the brake control terminals 33. This electromagnetic brake 32 is disengaged when it is energized. Control of the disengaging power (AC 100 V in illustrative example) is performed by the electromagnetic brake disengaging relay 34 which is controlled by the controller control section 28, however, the power upstream is connected to the rear of the drive power shut-off relay 26, and thus, with the drive power being shut off, the disengaging power is automatically shut off, the electromagnetic brake 32 being engaged to fix the actuator 30.

The AC servomotor driver module comprises the motor drive circuit 36 and the driver control circuit 38. The motor drive circuit 36 uses the power obtained from the motor drive power circuit 22 to drive the motor 40 through the motor power terminals 39, the motor drive wires (U, V, and W) being used for driving the motor 40. The driver control circuit 38 makes operation for the servo loop, controls the motor drive circuit 36, and monitors the motor for operation on the signals fed from the encoder 42, the reverse switch 43, and the advance switch 45 through the encoder limit switch terminals 41. The driver control circuit 38 may be included in the control module, depending upon the configuration of the controller. For example, for a small scale configuration, a single control device makes both controller control and driver control. When interpolation is made for more than one axis, high-speed servo operation for the axes is required, thus, the driver control section is mounted on the control module.

The general-purpose input/output module has a plurality of input/output terminals to control the peripherals, and is controlled by the controller control section 28. The general-purpose input/output terminals 44 are controlled in any one of the following events.
1) Execution of instruction in program
    Single output: ON/OFF, reverse, and pneumatic equipment control instructions
    M-code output: Parallel data output to such a peripheral device as a sequencer with a plurality of terminals
    Added module control output: The general-purpose input/output circuit output is used as the parallel data output port, and the parallel data controls the added module.
        Added I/O module (Up to 255 points can be added when the general-purpose input/output terminals handle 8 bits.) D/A conversion module (Provided for the voltage command type electro-pneumatic proportional valve to control the air balancer)
2) Force output: Pertaining to controlling by hand rather than program to check for operation of the peripherals and the proper connection.
3) Virtual input: Pertaining to executing a program with virtual input data with the input data for the general-purpose input/output being neglected to verify the proper operation of the program.
4) General-purpose input/output status specification: With this, the parameters take the predetermined particular statuses in the initial state or in the event of failure thereof to secure the safety of the peripherals.

The single-axis control module provides the heart of the controller function, comprising the controller control section 28, the buffer memory 46, and the control terminals 48. The controller control section 28 uses the browser function to download the peripheral module control, memory management, communications control, control terminal management, buffer memory management, program execution, failure routine and other control applets 136 through the network 150 (see FIG. 1) to execute them under the interpreter environment.

The control terminals 48 are terminals for controller operation from the external sequencer, control panel or other. The control terminals 48 provide the following basic operation input terminals and controller status output terminals:

Input Terminals
1) Start set-up input terminal (SET-UP)
This terminal is used to make set-up for operation of the actuator. It automatically provides the operations necessary for the actuator executing a program, such as drive power ON, servomotor ON, and zero-point return. The terminals which, up to now, have been individually provided for the operations are automated and unified to minimize the number of terminals and reduce the load on the external device (such as a sequencer). It can prevent an illogicality with a similar operation (conflicting instructions) caused by a program, program device or other.
2) Program number specifying terminal (Pro-No.)
This terminal is used to specify the program to be executed among a plurality of programs built into the controller.
3) Step number specifying terminal (Stp-No.)
This terminal is used to specify only a particular step (line) in the program.
4) Start input (RUN)
This terminal is used to start execution of the specified program (specified step).
5) Halt input (HOLD)
This terminal is used to halt the execution of the program. Running will be stopped immediately or after the step being executed. The way of halting can be selected with the parameter.
6) Emergency stop (STOP)
This terminal is used to stop the execution of the program in accordance with the failure routine in the controller control section 28 so that the actuator is a rapidly and safely stopped.

Output terminals
1) Controller ready output (REDY)
This terminal is used to indicate that the controller functions are active.
2) Start set-up completion output (SET-UP)
This terminal is used to indicate that the start set-up is completed and the program can be executed.
3) Busy signal (BUSY)
This terminal is used to indicate that the program and the actuator are in operation.
4) Alarm output (ALM)
This terminal is used to indicate that a fault is caused.

The buffer memory 46 (memory for data reception and transmission) provides a dedicated memory space for data exchange between an external device connected to the controller through the interface module (or the controller common bus) and the controller control section 28.

In the buffer memory 46, a register wherein a particular address is provided with a specific function is placed, and can be freely accessed from a peripheral device through the controller control section 28 and the interface module.

The buffer memory 46 can be mainly divided into the following four areas by the type of function.
1) Operation data area (46a)
This area can be basically divided into the data area allowing the controller to be operated, managed, and monitored from a peripheral device; the programmer operation data area provided with a function equivalent to that of the control terminals; and the monitoring data area whereinto the operation statuses are always written from the controller control section 28.
2) Program data area (46b)
This area is used to store the operation programs for the actuator and the peripheral devices. Programming of the controller can be made by writing program data into this area.
3) Parameter area (46c)
This area is used to store the parameters to make function selection and adjustment for operating the actuator. With this area, the type of the actuator (the stroke, the ball screw lead, whether a brake is given or not, etc.), and the operating conditions (the load, the speed limits, the course of zero-point return, etc.) are set.

4) System constant area (46*d*)

This area is used to store the parameters to make selection and adjustment for configuration of the controller control function.

The communication port (communication module) provides a module to connect the buffer memory to an external device. The controller downloads control applets 136 to the program data area from an external device, such as the server 160, through the communication port 50.

Next, the actual operation of the functions of the controller thus configured will be described by taking, as an example, of a group of devices that comprises a plurality of controllers and actuators.

Figure 4:
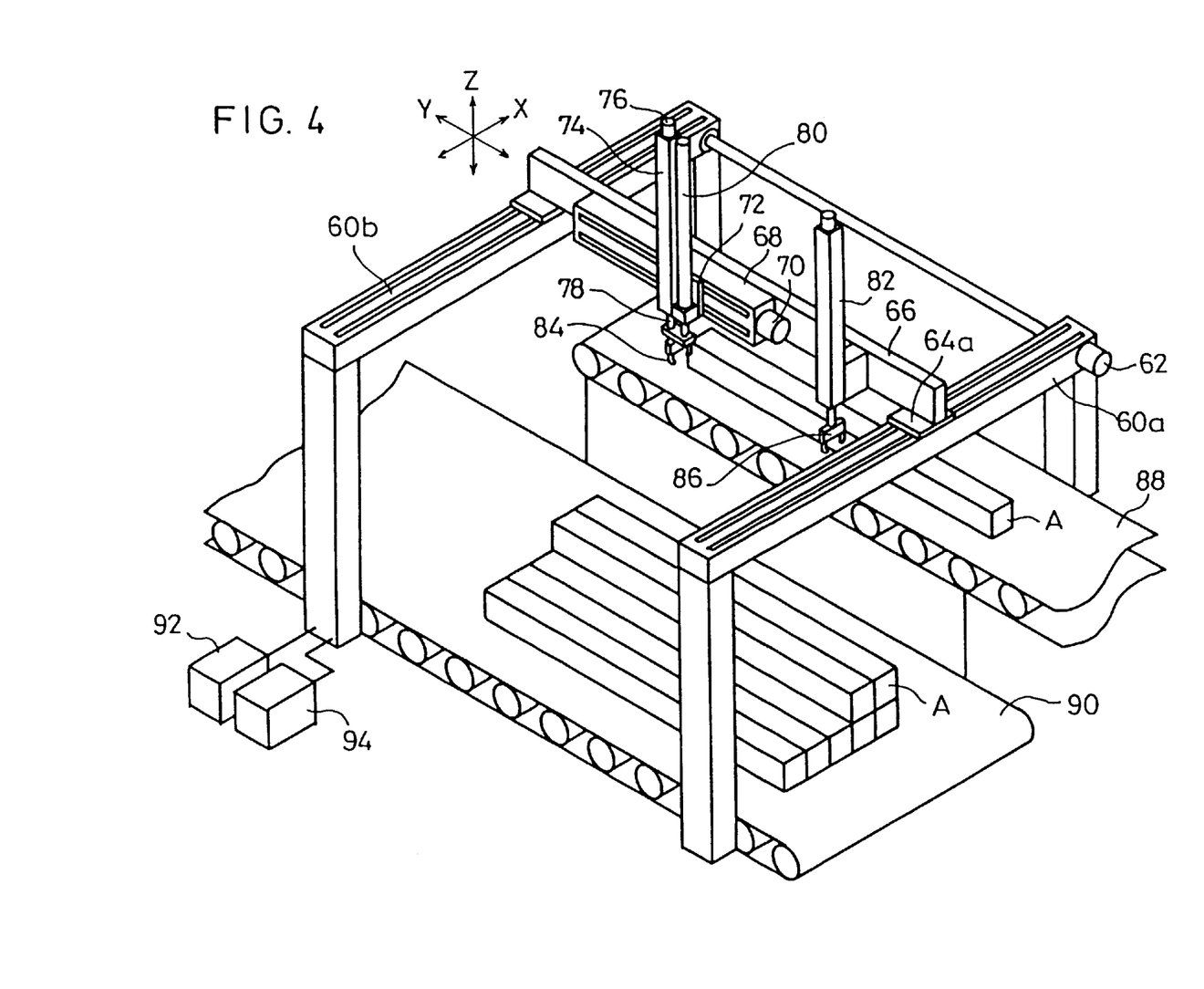
FIG. 4 shows a configuration diagram of the system whereto the actuator controller is applied.

FIG. 4 shows a part of an automatic packaging device for extruded profiles (aluminum profiles). The X-axis actuators 60*a* and 60*b* are actuators using timing belts, being driven by a single servomotor 62, and across the tables 64*a* and 64*b* for these X-axis actuators 60*a* and 60*b*, a structural member 66 constituting the Y axis is jointed. To the Y-axis structural member 66 is mounted one actuator 68. The Y-axis actuator 68 is an actuator using a servomotor 70 and a feed screw not shown in the figure, and to the moving table 72 is mounted a Z-axis actuator 74. The Z-axis actuator 74 is a motor-operated cylinder which moves the rod 78 by means of the servomotor 76 and a feed screw. The Z-axis actuator 74 is installed in conjunction with an air cylinder 80, being connected with it at the end of the rod 78. To the Y-axis structural member 66 is mounted a second Z-axis actuator 82 so that it cannot be moved in the direction of the Y-axis. At the ends of the Z-axis actuators 74 and 82, air chucks 84 and 86 are provided respectively. In the base of the actuator structure thus configured, the first and second belt conveyors 88 and 90 are installed.

This device operates as follows:

An aluminum profile A is carried in from the right side by the belt conveyor 88. The X-axis actuators 60*a* and 60*b* move the Y-axis structural member 66 to above the profile A. The Y-axis actuator 68 moves the Z-axis actuator 74 to above the central portion of the profile A. The first and second Z-axis actuators 74 and 82 are moved downward, being synchronized with each other, and grip the profile A by means of the respective air chucks. After the gripping, the Z-axis actuators 74 and 82 are moved in the reverse direction, i.e., upward, and then the X-axis actuators 60*a* and 60*b* are moved to above the second belt conveyor 90 to deposit the profile A on the stack while aligning it. When the arrangement of profiles A on the second belt conveyor 90 forms a specific unit, the second belt conveyor 90 moves the arrangement of profiles A leftward in the figure.

Figure 5:
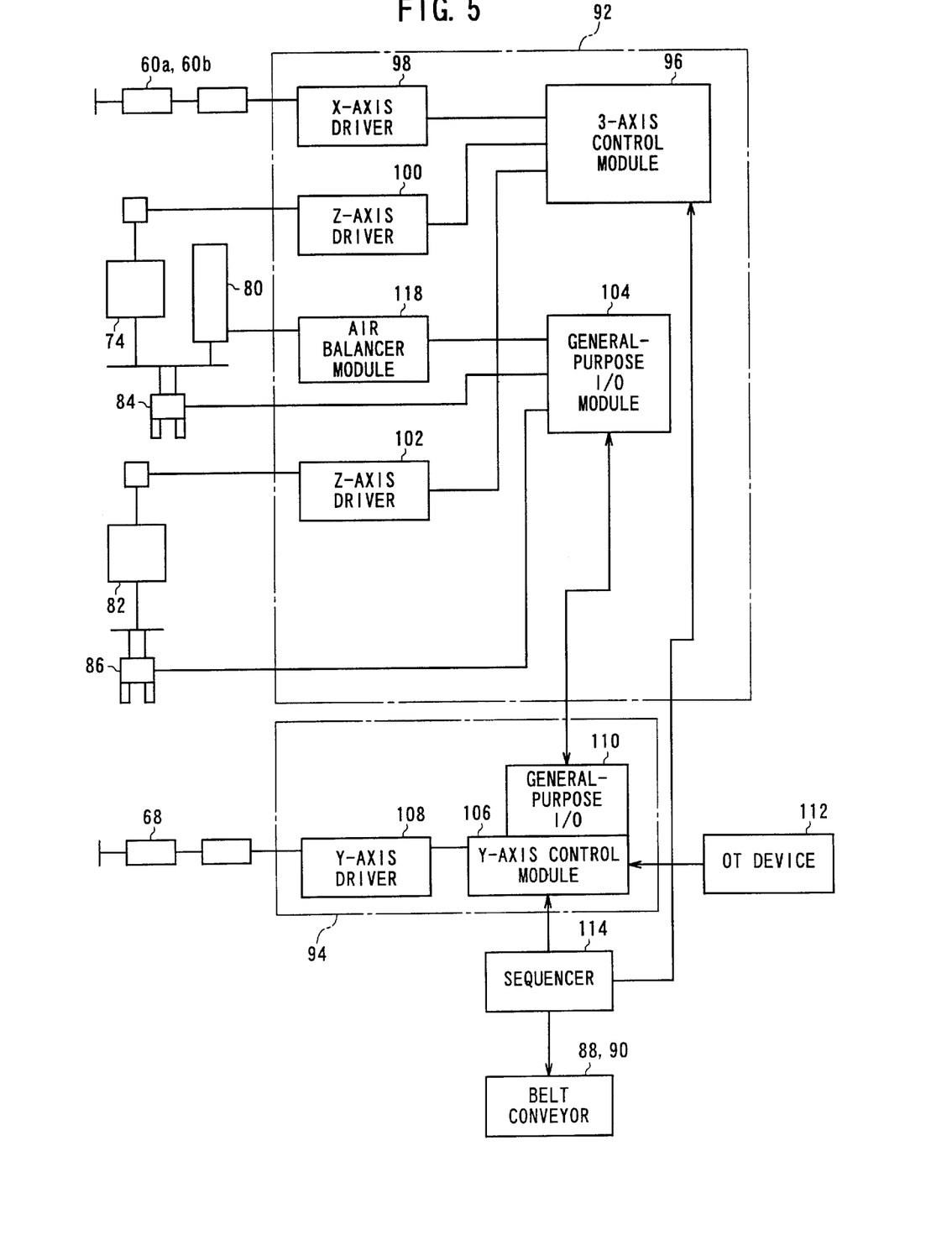
FIG. 5 shows a configuration block diagram of the actuator controller used with the system as shown in FIG. 4.

The configuration of the device has the following features:

1) Because the profile A has a large weight, the first Z-axis actuator 74 provides air balance by use of the air cylinder 80.
2) The first Z-axis actuator 74 must grip the profile A in the vicinity of the center of gravity. The Y-axis actuator 68 is provided to move the first Z-axis actuator 74 to near the center of gravity of the profile A. Due to the nature of the product, the overall length of the profile A varies depending upon the job lot, thus, the gripping position of the first Z-axis actuator 74 (the traveling position of the Y-axis actuator 68) must be adjusted to suit to the job lot.
3) The second and first Z-axis actuators 74 and 82 must be operated in synchronism with each other to vertically move the profile A while keeping it in the horizontal position.
4) To shorten the working time, the X-axis actuators 60*a* and 60*b* and the Z-axis actuators 74 and 82 make interpolated operation so that the path of movement is optimized. The device has two controllers 92 and 94 as shown in FIG. 5.

The first controller 92 controls the X- and Z-axis actuators 60*a*, 60*b*, 74 and 82, and the air chucks 84 and 86. The second controller 94 controls the Y-axis actuator 68. The first controller 92 is configured around the 3-axis control module 96. The 3-axis control module 96 controls the actuator motor drivers 98, 100, and 102 to provide synchronized operation of the actuators 60*a*, 60*b*, 74, and 82, and interpolated operation of the actuators 74 and 82.

Figure 6:
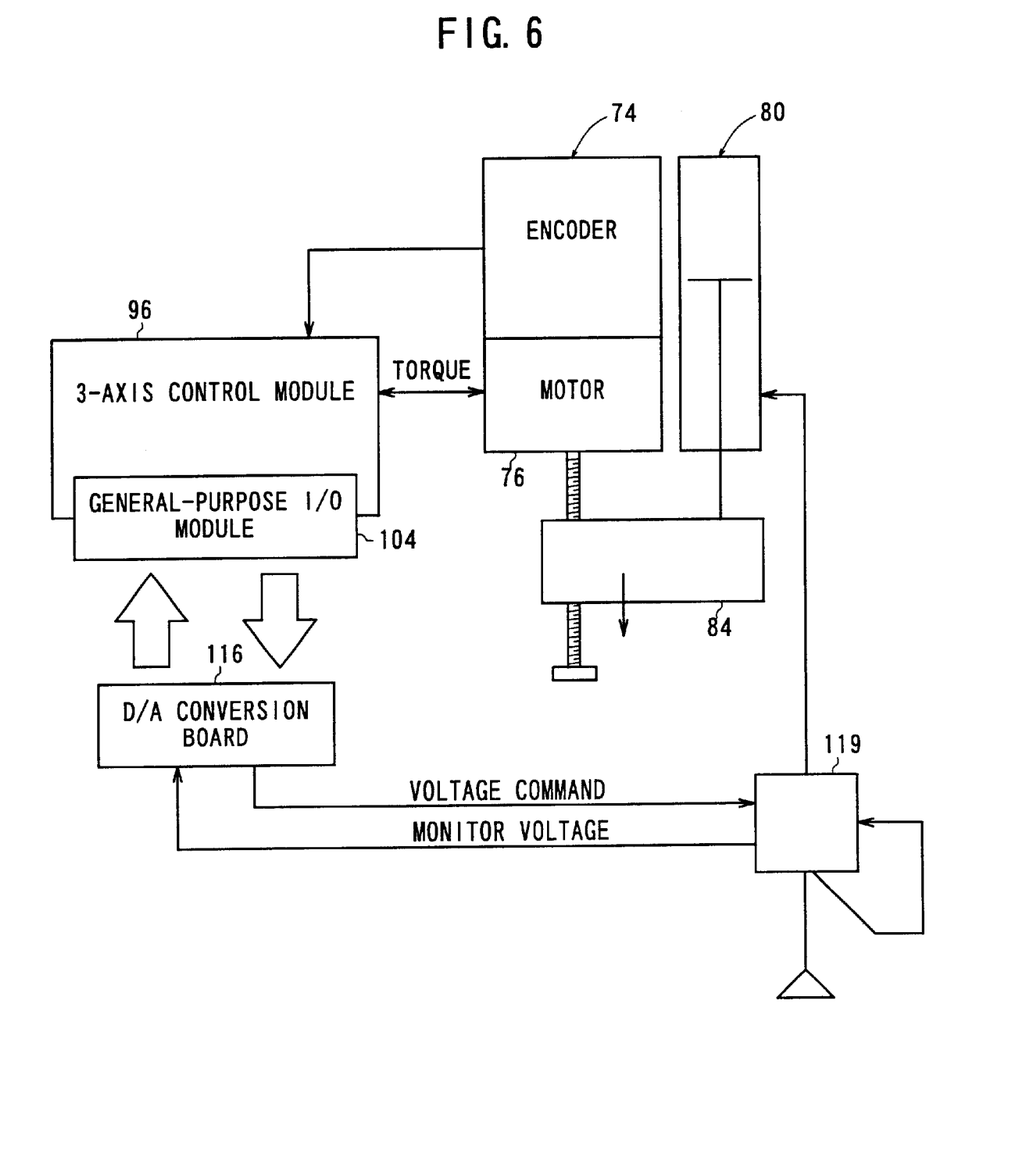
FIG. 6 shows an explanatory diagram of the configuration including the air balancer module as shown in FIG. 5.

The air cylinder 80 provided in conjunction with the actuator 74 functions as an air balancer with the electro-pneumatic proportional pressure control valve 119 connected to the D/A conversion board 116 added to the general-purpose input/output module 104 (FIG. 6). These constitute the air balancer module 118. The general-purpose input/output module 104 also makes opening and closing control of the air chucks at the end of the actuators 74 and 82. The controller also has a serial interface module and a power supply module, the illustration of which is omitted here.

The second controller 94 controls the Y-axis actuator 68 by means of the one-axis module 106 and the Y-axis actuator driver module 108. This one-axis module 106 is provided with an external teaching function (TO function) which allows the positioning point for the Y-axis actuator 68 to be directly changed from the outside without using a program, and is equipped with a general-purpose input/output module 110 for that purpose. To the general-purpose input/output is connected a setting switch board (the TO device 112).

The first and second controllers 92 and 94 connect the general-purpose input/output modules 104 and 110 to each other to execute the synchronous programs for both. For integrated control of these controllers 92 and 94, and the belt conveyors 88 and 90, a sequencer 114 is provided, and is connected to the control terminals for the first and second controllers 92 and 94.

Next, to understand the operation of the respective controllers 92 and 94, the special functions and modules will be described hereinafter.

With the air balancer module 118, to make air servo control in a broad sense in the control system, three basic methods are available. One method is to provide a special air servo module. This module can achieve a high degree of control, however, it is relatively expensive, and requires a great change of the control module before introduction.

A second method is to use a control module dedicated for the air balancer. The module has the air pressure adjusting analog output which is controlled in relation to the servo loop for the motor, and is best suited for controlling the motor and the air servo in relation to each other, however, because the characteristic values for the actuator unit and the air balancer unit can affect the loop, the application is limited to an actuator with an air balancer. A third method is to add a D/A conversion board to the general-purpose input/output module for making control with air balancer software. This method is low in capacity, however, by slightly changing the controller which takes a general actuator control configuration, it can be easily implemented, and is best suited where air support is made by post-attaching a general-purpose air cylinder to the motor-operated actuator.

In the present embodiment, air balancer control is performed by use of the added D/A conversion board 116. The general-purpose input/output module 104 for the controller connects the input/output having consecutive eight points, respectively, to the D/A conversion board 116. The D/A conversion board 116 converts 8-bit parallel data into an analog output, and, conversely, it converts an analog input into 8-bit data for output. The balance air pressure for the air cylinder is adjusted by the air balancer module 118. The air balancer module 118 adjusts the secondary pressure in accordance with the voltage input, and at the same time, puts out the pressure state of the secondary side with a voltage as a monitor output. The 8-bit data from the general-purpose input/output for the controller is analog-output by the D/A conversion board 116, being monitored by the air balancer module 118 on the voltage value, and the analog output is supplied to the general-purpose input/output module 104 for the controller 92 as 8-bit data by the D/A conversion board 116. Thus, the controller 92 can set the supply pressure for the air cylinder 80 and monitor it.

The air balancer software: provides functional software to operate the air cylinder 80, which is operated in parallel with the actuator, as an air balancer, having the following functions:

Balance air pressure automatic tuning: This function is used to set the air pressure to balance the actuator load. With the actuator drive power being shut off, the air pressure is increased or decreased, and the upward or downward movement of the load is sensed with the encoder output to calculate the optimum balance air pressure (the balance air pressure is the average of the pressures at both points of time where increasing the air pressure raises the workpiece, and decreasing it lowers the workpiece).

Load variation compensation (automatic drift compensation): This function compensates for the drift of the balance air pressure that is caused by a variation in load or resistance during operation. It monitors the actuator motor torque to sense a variation in torque under the same operating conditions, and compensates for the drift of the balance air pressure.

Balance air pressure step setting: This function adjusts the balance air pressure to the specified value with an instruction in the program. When the actuator load in such an operation as transportation greatly varies, an appropriate one of the several different balance air pressures is selected.

Air alarm: This function senses an abnormal balance air pressure. If secondary pressure monitor data of the predetermined level (90% of the setting value, for example) is not obtained within the predetermined time after balance air pressure data being put out (in other words, when input is awaited beyond the time limit), an alarm is issued.

The air chucks are controlled with a pneumatic device control instruction through the general-purpose input/output. For control, the system waits for input within the time limit from the air chuck operation identification switch.

With the TO device 112, when the actuator operation position is to be changed to suit to the type of operation, it is generally required to change the program. However, to do this, connection to a programming tool must be made, and for making change operation, expertise is required. The present device allows direct data change by JOG teaching without using a programmer for the above change which is often required for service. The control module for the present function is provided with terminals dedicated for JOG (+) and JOG (−) operation input, point number specifying input, setting instruction input, and setting completion output. The actuator is moved to the desired position by jog run, and a point number is specified. With the setting instruction terminal being turned ON, the positional data for the specified point number is changed into the address for the actuator in that state. After change, a setting completion signal is put out.

INDUSTRIAL APPLICABILITY

As described above, the automatic control system according to the present invention is configured so that a control program (control applet) to control the control object device is downloaded through a network to the control device having a browser function and an interpreter environment to be executed, thus, an effect of that a control program can be utilized independently of the difference in processor, OS, bus configuration, network (communication) protocol, etc. for the control device constituting the automatic control system is obtained.

In other words, the automatic control system according to the present invention eliminates the need for separately preparing a control program every time a computer device with a different OS is used, or every time the bus configuration between computer devices, or between a computer device and the object device controlled thereby, the network (communication) protocol, or other is different, thus, an effect of that an increase in man-hours and cost for program development, and that in man-hours for program management can be avoided is provided.

What is claimed is:

1. An automatic control system comprising:
    a server offered by a service provider that stores control applets to control a particular control object device;
    a control device comprising a control object device and a computer device to control said control object device, wherein said control object device comprises an actuator; and
    a network to connect said server with said control device, said computer device comprising a browser function, and an interpreter environment to execute at least one of said control applets in said control device, and said computer device being configured for accessing said server through said network to download and execute a desired control applet in said control device for controlling operation of said actuator.

2. An automatic control system according to claim 1, wherein an accounting system for said control applets used is connected to said network.

3. An automatic control system according to claim 1, wherein said control applets stored in said server are JAVA applets stated in the JAVA language.

4. An automatic control system according to claim 1, wherein said control device comprises:
    a virtual machine which is connected to said network, and to which a desired control applet is downloaded by using the browser function;
    an FA network connected to said virtual machine;
    a plurality of controllers connected to said FA network; and
    a plurality of control object devices controlled by said each controller,
        each of said controllers being configured for accessing said virtual machine through said FA network to download and execute the desired control applet, whereby making control each of said control object devices.

5. An automatic control system according to claim 1, wherein said control applets are control programs, such as drivers to control respective actuators, said actuators being selected from the group consisting of machine tools, motor operated actuators, and pneumatically operated actuators.

6. An automatic control system comprising:
- a server offered by a service provider that stores control applets to control a particular control object device;
- a control device comprising a control object device and a computer device to control said control object device; and
- a network to connect said server with said control device;
    - said computer device comprising a browser function, and an interpreter environment to execute said control applets, and
    - said computer device being configured for accessing said server through said network to download and execute a desired control applet, whereby making control said control object device, wherein said control device comprises:
        - a virtual machine which is connected to said network, and to which a desired control applet is downloaded by using the browser function;
        - an FA network connected to said virtual machine;
        - a plurality of controllers connected to said FA network; and
            - a plurality of control object devices controlled by said each controller, each of said controllers being configured for accessing said virtual machine through said FA network to download and execute the desired control applet, whereby making control each of said control object devices.

* * * * *